Dec. 22, 1953　　　　　　　C. H. GAIL　　　　　2,663,038
MACHINE FOR MAKING BED SPRINGS
Filed Oct. 26, 1948　　　　　　　　　　　　　10 Sheets-Sheet 1

Inventor
CHARLES H. GAIL
By C. G. Stratton
Attorney

Dec. 22, 1953  C. H. GAIL  2,663,038
MACHINE FOR MAKING BED SPRINGS
Filed Oct. 26, 1948  10 Sheets-Sheet 2
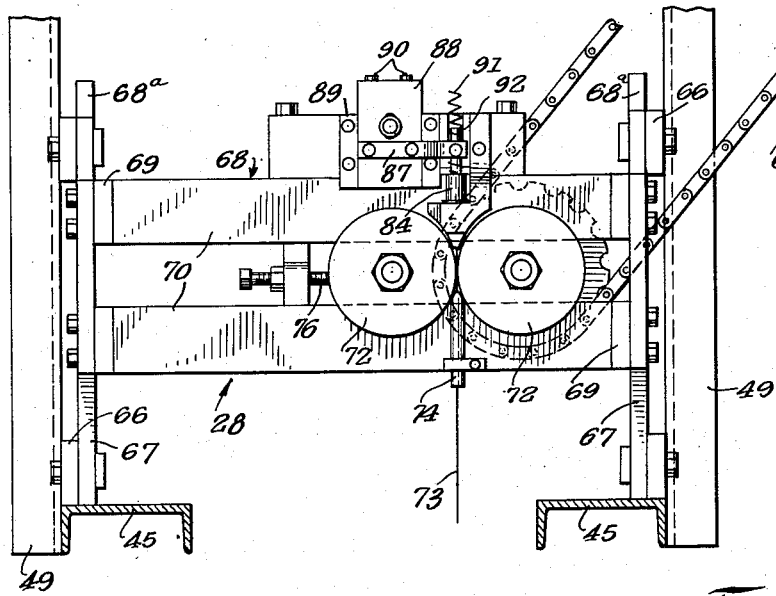
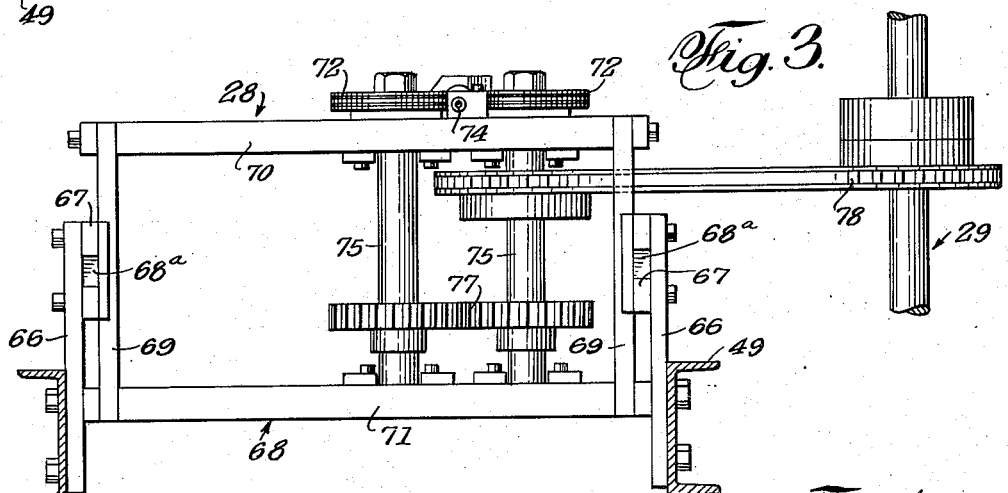
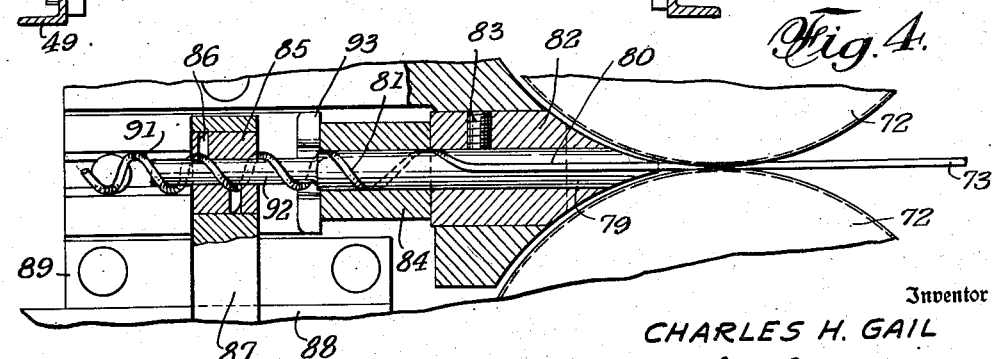
Inventor
CHARLES H. GAIL
By C. G. Stratton
Attorney

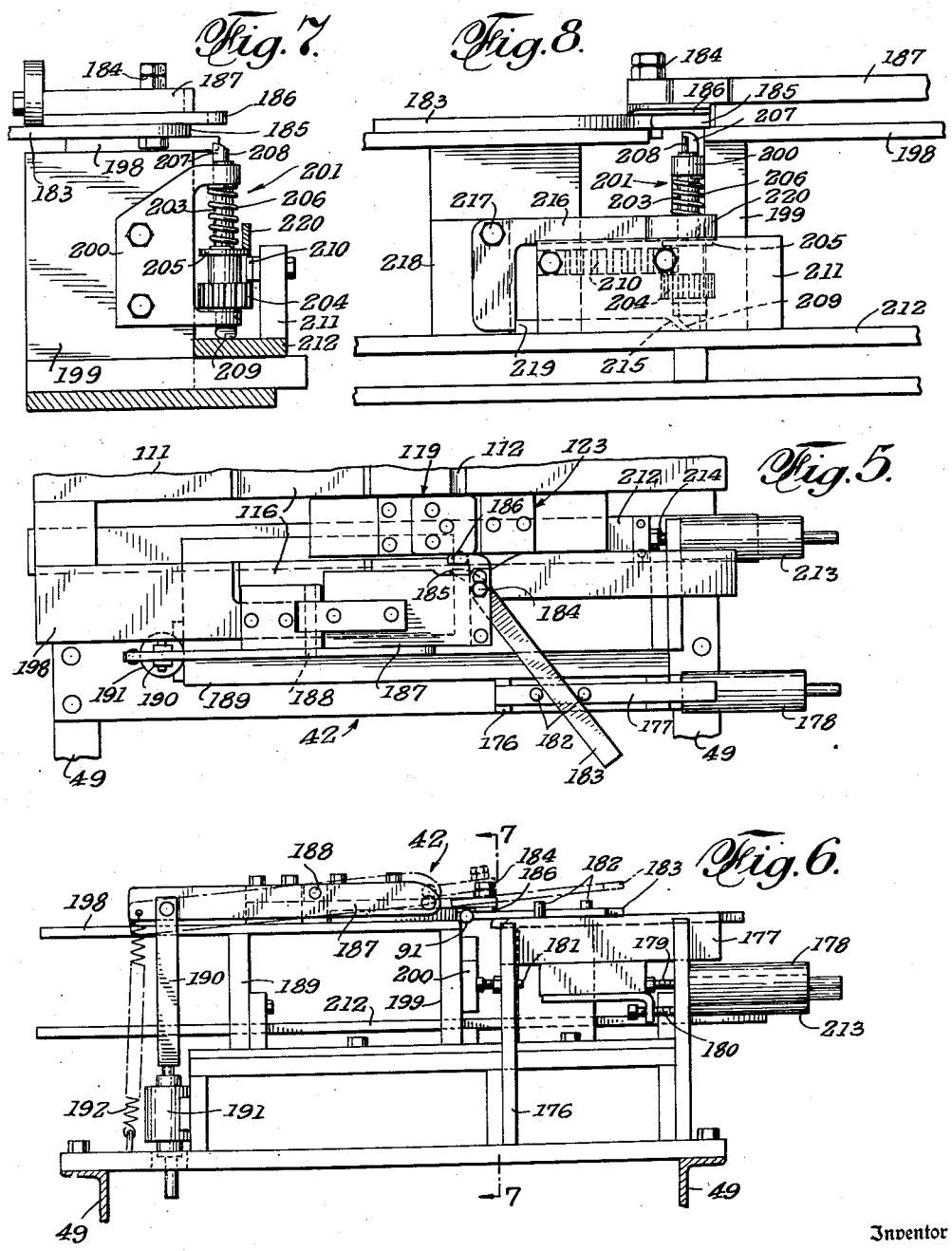

Dec. 22, 1953  C. H. GAIL  2,663,038
MACHINE FOR MAKING BED SPRINGS
Filed Oct. 26, 1948  10 Sheets-Sheet 4

Inventor
CHARLES H. GAIL
C. G. Stratton
Attorney

Dec. 22, 1953  C. H. GAIL  2,663,038
MACHINE FOR MAKING BED SPRINGS
Filed Oct. 26, 1948  10 Sheets-Sheet 5

Inventor
CHARLES H. GAIL
By C. G. Stratton
Attorney

Dec. 22, 1953   C. H. GAIL   2,663,038
MACHINE FOR MAKING BED SPRINGS
Filed Oct. 26, 1948   10 Sheets-Sheet 6
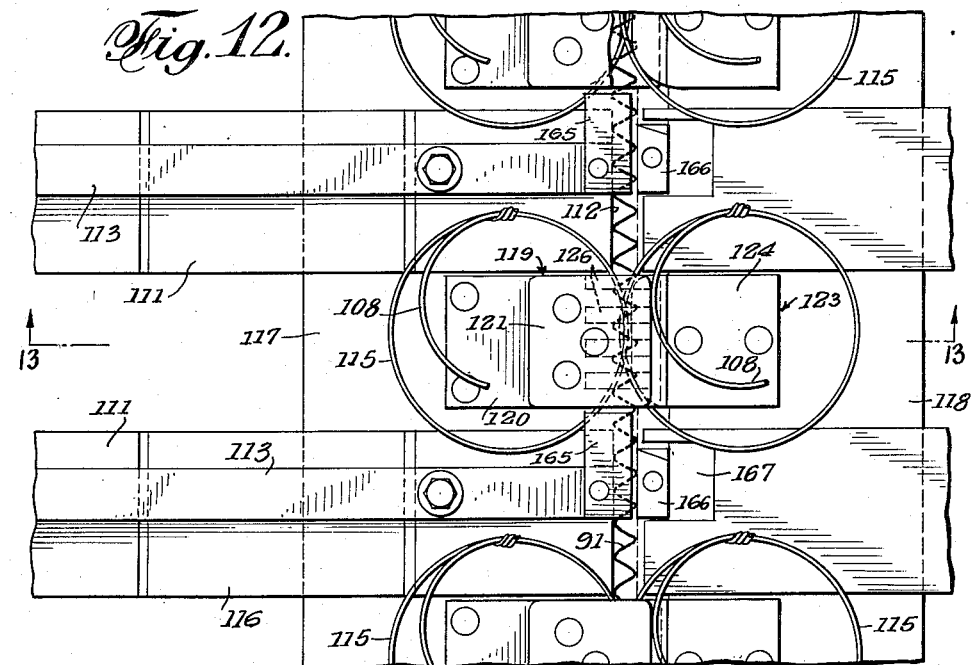
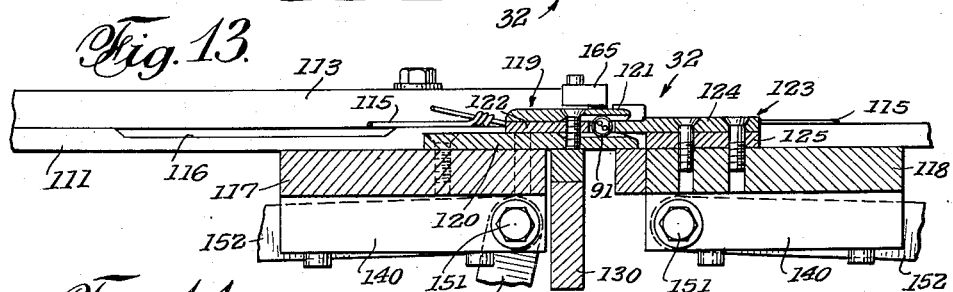
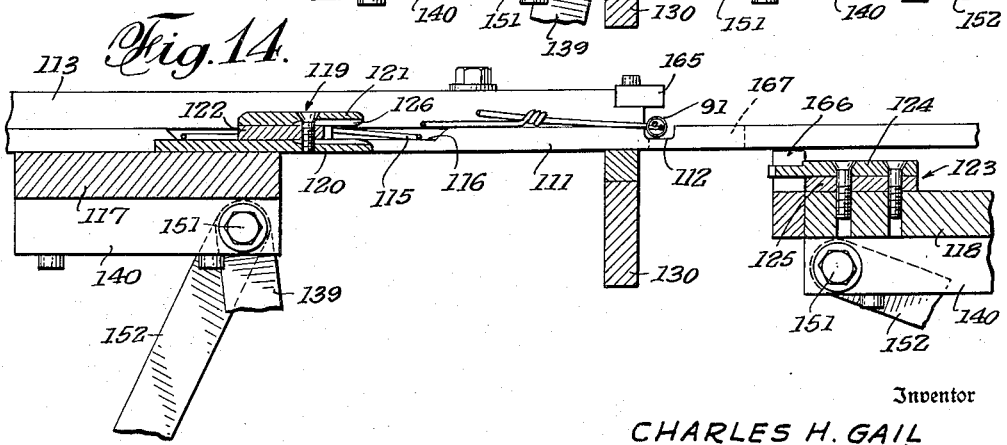
Inventor
CHARLES H. GAIL
By C. G. Stratton
Attorney

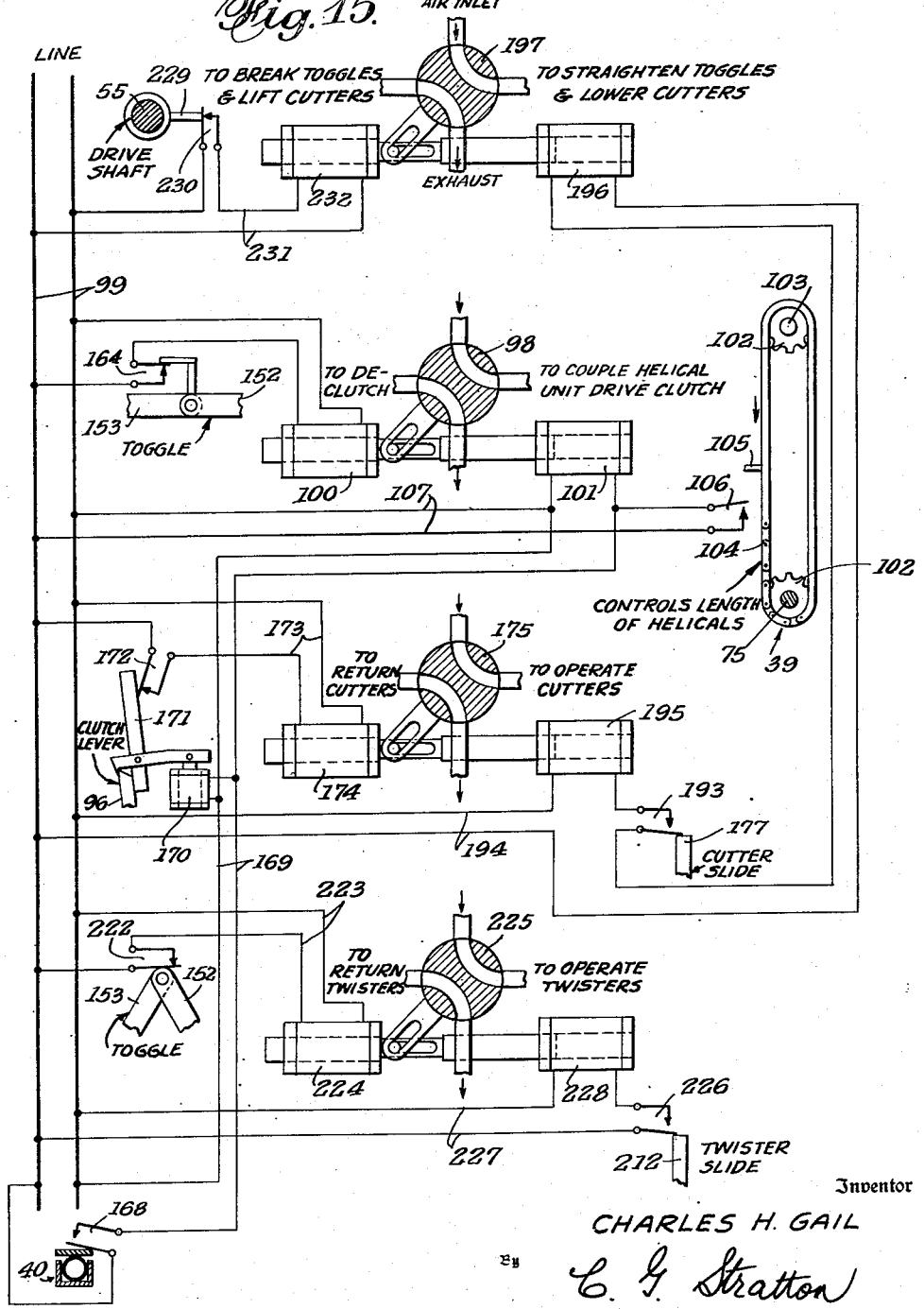

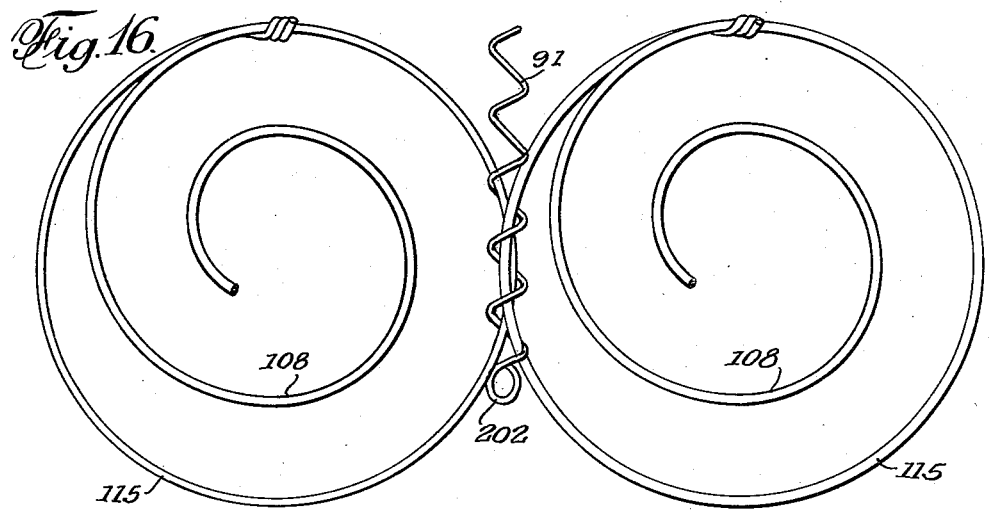
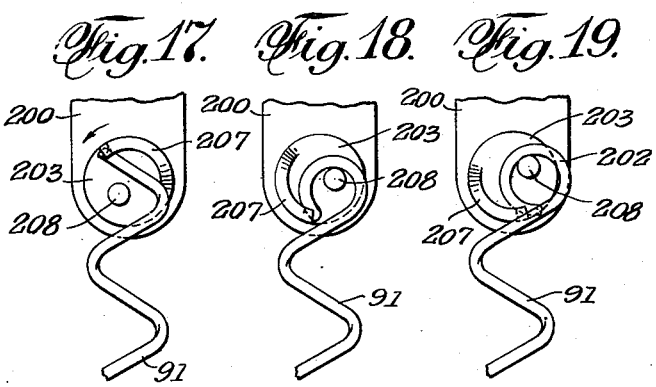
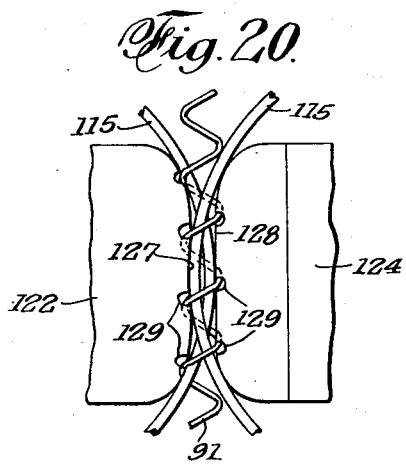
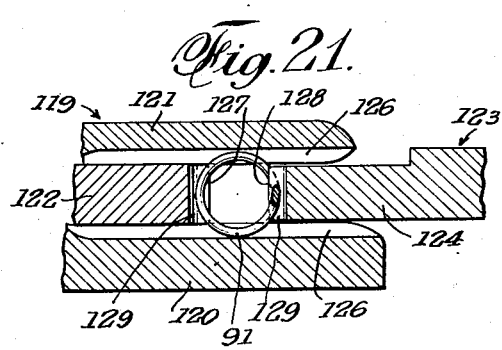

Dec. 22, 1953  C. H. GAIL  2,663,038
MACHINE FOR MAKING BED SPRINGS
Filed Oct. 26, 1948  10 Sheets-Sheet 9
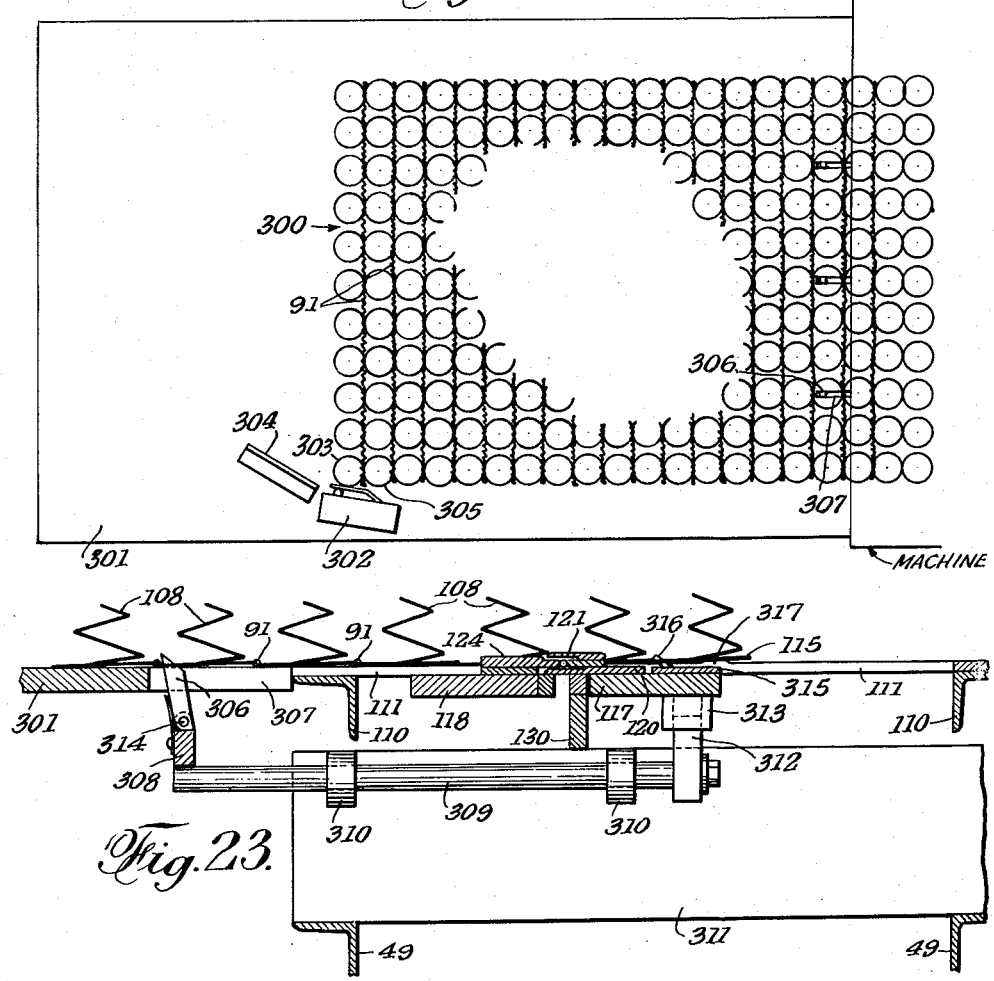
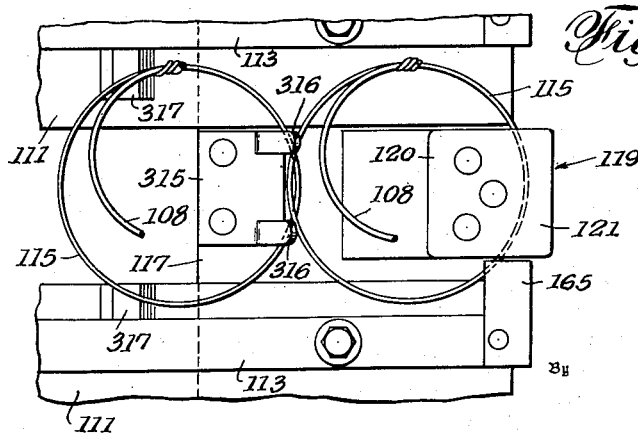
Inventor
CHARLES H. GAIL
By C. G. Stratton
Attorney

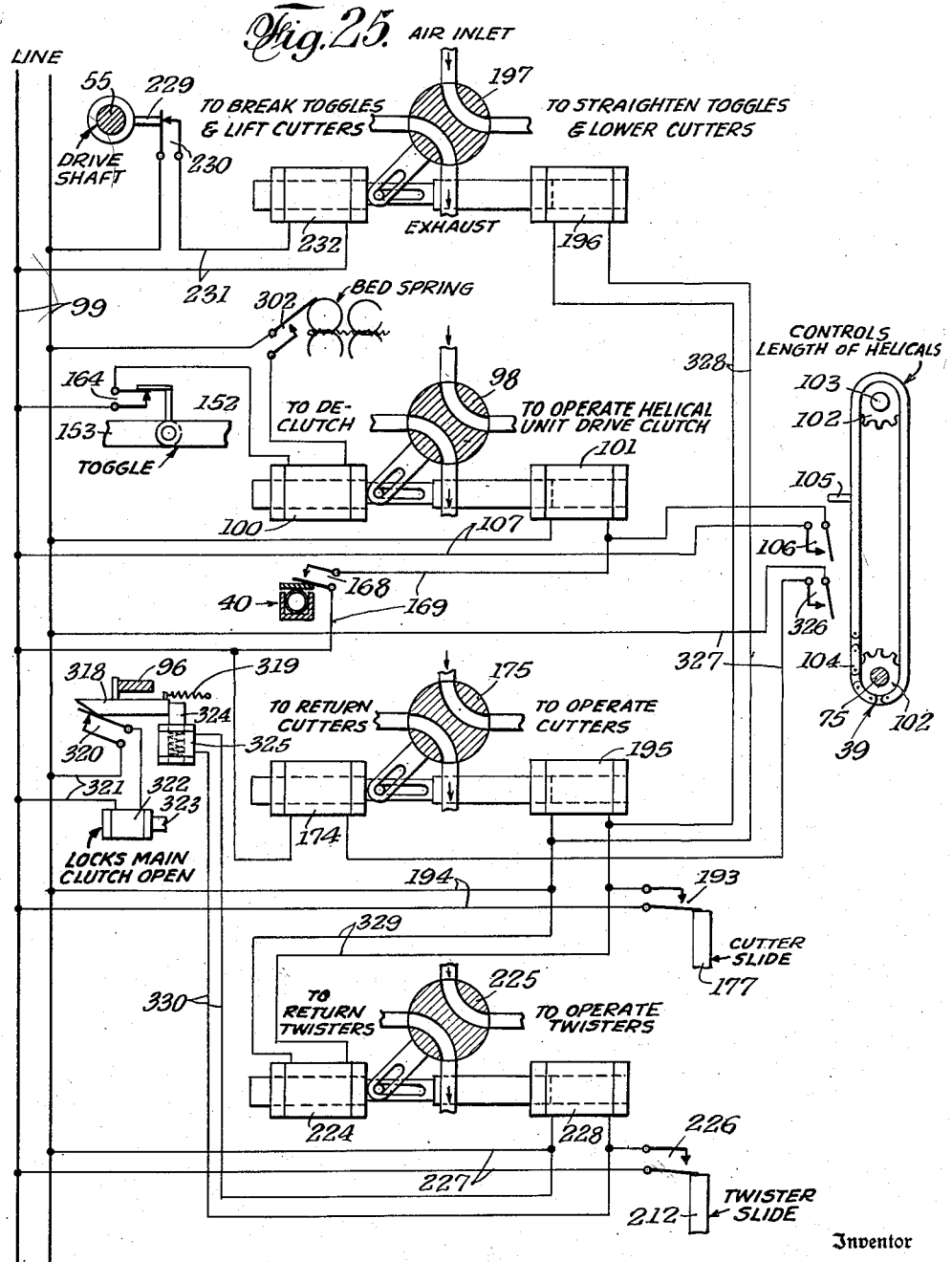

Patented Dec. 22, 1953

2,663,038

UNITED STATES PATENT OFFICE 2,663,038

MACHINE FOR MAKING BED SPRINGS

Charles H. Gail, Los Angeles, Calif., assignor to Spring Machinery Company, Los Angeles, Calif., a corporation of California Application October 26, 1948, Serial No. 56,635

14 Claims. (Cl. 140—92.8)

This invention relates to a machine for producing bed springs. The present machine and method deals with the production of a bed spring formed of several side-by-side rows of spring coils and a helical connector for the adjacent respective upper and lower turns of the coils.

An object of the present invention is to provide a machine for carrying out the successive steps of connecting adjacent rows of coils by means of helical connectors and forming closed loops on the ends of said connectors to obviate accidental tearing, by said ends of any fabric employed to cover the completed bed spring.

Another object of the invention is to provide a machine in which the successive operations are controlled by preceding operations to thereby effect a continuity of operation that is of successive nature to insure that the resultant product will be without defect.

Another object of the invention is to provide novel and improved means for fixedly holding the coils of two rows of coils, whereby the same may be effectively inter-connected by helical connectors automatically fed by the machine and for effecting such feed only when the coils are properly held.

A further object of the invention is to provide means effective upon an abnormal condition in the feed of the helices to automatically stop their feed and thereby prevent undue fouling of the machine.

A further object of the invention is to provide a machine in which the feed of the helical connectors is controlled according to the length of the rows of spring coils connected thereby, said feed then automatically cutting off the helices, effecting release of the fixedly held rows and forming closed loops on the ends of the helices to obviate tearing of a fabric cover for the completed bed spring.

A still further object of the invention is to provide a machine of the character indicated in which the sequential operation is accomplished by mechanical means under the control of electro-pneumatic means, each operation, on completion, setting up the next operation to insure stoppage of the machine should any operation be improperly performed.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes preferred embodiments of the present invention, which are given by way of illustration or example only.

In the drawings, like reference characters designate similar parts in the several views.

Fig. 2 is an enlarged plan view of a lower helix forming and feeding unit employed in the invention, the view being taken on the plane of line 2—2 of Fig. 1.

Fig. 3 is an end elevational view thereof as taken on line 3—3 of Fig. 1.

Fig. 4 is a further enlarged fragmentary plan sectional view of the helix forming means.

Fig. 5 is a plan view of a lower helix cutting and end loop forming unit, the view being taken in the plane of line 5—5 of Fig. 1.

Fig. 6 is an end elevational view thereof as taken on line 6—6 of Fig. 1.

Fig. 7 is an enlarged cross-sectional view on line 7—7 of Fig. 6.

Fig. 8 is a broken view as seen from the right side of Fig. 7, the view also being the rear of Fig. 6.

Fig. 12 is an enlarged broken plan view as taken on line 12—12 of Fig. 1.

Fig. 13 is a cross-sectional view on line 13—13 of Fig. 12.

Fig. 14 is a similar view with the parts moved to indicate the manner of moving the spring coils to the position where they are connected by the helices.

Fig. 15 is a wiring diagram of the instrumentalities of the machine to show the sequential performance of the machine operative steps.

Fig. 16 is a plan view showing two coils and the manner of their connection by a helical connector.

Figs. 17, 18 and 19 are fragmentary plan views of one helix end loop forming means showing three stages of its operation.

Fig. 20 is a fragmentary plan view of block means employed for holding adjacent coils in fixed position to be connected by a helix.

Fig. 21 is an enlarged cross-sectional view thereof.

Fig. 22 is a semi-diagrammatic plan view of a bed spring as produced by the present machine and associated with means provided for omitting the forming and feeding of helicals after a predetermined number of rows of coils have been embodied in said bed spring.

Fig. 23 is an enlarged fragmentary cross-sectional view thereof showing means for moving the completed bed spring away from the machine producing the same.

Fig. 24 is a broken plan view, similar to Fig. 12, of a modification.

Fig. 25 is a wiring diagram, the same being a modification of the diagram shown in Fig. 15.

Figure 1:
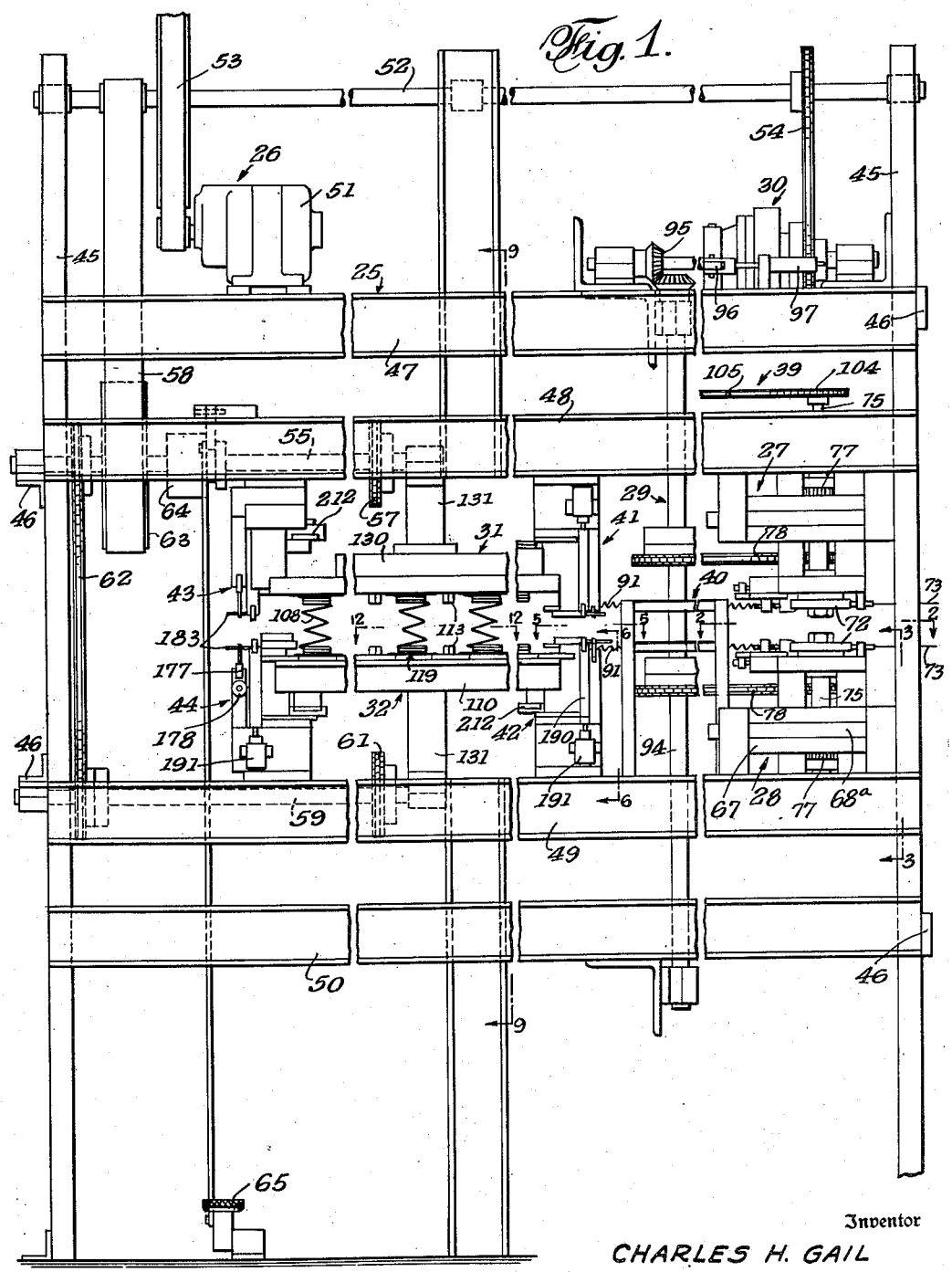
Fig. 1 is a broken side elevational view of a machine for producing bed springs and embodying features of the invention.

The present machine, as illustrated, comprises, generally, a frame 25 which carries all of the hereinafter enumerated means; driving means 26; a similar upper and lower helix forming and feeding units 27 and 28; a drive 29 for said units; clutch means 30 interconnecting the latter drive and the driving means 26, similar upper and lower means 31 and 32 cooperating to engage rows of spring coils therebetween to hold said coils in fixed position in side-by-side rows to receive the helices fed thereto by the units 27 and 28; similar upper and lower means 33 and 34 for moving upper and lower portions, on one side, of the means 31 and 32; similar upper and lower means 35 and 36 for moving upper and lower portions, on the other side, of said means 31 and 32; fixed upper and lower means 37 and 38 for guiding the manual positioning between them of a row of spring coils for subsequent movement by 33, 34, 35 and 36; means 39 for controlling the length of feed of the helices formed by units 27 and 28; means 40 responsive to an obstruction to said feed to stop the same; upper and lower front units 41 and 42 and upper and lower rear units 43 and 44 for cutting both ends of both helices and for forming said ends into closed loops; and electro-pneumatic controls for effecting a sequence of operations, whereby any one operation is performed only after a preceding operation has been performed.

The frame 25, that is shown, comprises vertical end frame channels 45 connected by cross members 46, and a series of longitudinal channels 47, 48, 49 and 50 connecting channels 45 at both sides of the frame. Additionally, the frame is provided with such cross members supported by channels 47 to 50, as may be needed to mount the elements of the machine.

The driving means 26 comprises an electric motor 51 mounted on channels 47, a longitudinal shaft 52, and a drive 53 between the latter shaft and the motor. A drive 54 is provided between shaft 52 and clutch 30. An upper pair of shafts 55 and 56, having a chain and sprocket connection 57, is driven by a belt and pulley arrangement 58, from shaft 52. A lower pair of shafts 59 and 60, having a chain and sprocket connection 61, is driven by a chain and sprocket 62 from either shaft 55 or 56. The pulley 63 of drive 58 is normally loose on its shaft—in this case, shaft 55, and a one-revolution clutch 64, controlled by a foot-operated pedal 65, serves to couple said pulley and shaft to effect a drive of shafts 55, 56, 59 and 60 from the motor 51. Upon stepping on pedal 65 the latter shafts will make one revolution and stop.

The upper and lower helix forming and feeding units 27 and 28, located at the right of Fig. 1, are driven from shaft 52 through the medium of drive 54, clutch 30 and drive 29. These units are substantially alike. The lower unit 28 is shown in Figs. 2, 3 and 4 and the following description thereof also describes unit 27.

The longitudinal channels 49 support fixed side frames 66 in each of which is embodied a slide guide 67 for slide bars 68a the latter being connected by a slidable frame 68 extending across the machine frame 25. Said frame is generally rectangular and is formed of side members 69 connected at the top by transverse members 70 and, at the bottom, by similar members 71. The units 27 and 28 are thus mounted for longitudinal adjustment of the machine frame.

Atop frame 68 there is provided a pair of wire feeding wheels 72, positioned side-by-side to feed a wire 73 between them in a direction toward the left, as seen in Fig. 1, and guided as by a guide tube 74. Each wheel 72 is mounted on a shaft 75 in upper and lower bearings carried by frame members 70 and 71. The wheels 72 are peripherally grooved for the wire 73 and, by an adjustment 76, one of the wheels can be adjusted with respect to the other to effect proper feeding of the wire. A pair of gears 77 connect shafts 75 and a chain and sprocket drive 78, from one of the shafts is made to drive 29. Thus the wheels 72 rotate in opposite directions to effect the mentioned wire feed.

A fixed mandrel 79 that is formed with a longitudinal groove 80 which, toward the end thereof away from wheels 72, gradually is formed as a helical groove 81, receives the wire from wheels 72. The mandrel resides in a hardened sleeve 82 and a set screw 83 fixedly holds said mandrel in the sleeve. A rear collar 84 is strung over the helically grooved portion of the mandrel. As the wire 73 is fed to the mandrel, the same follows along grooves 80 and 81 to be helically formed and emerges from between the mandrel and collar 84 as a helix of approximately the desired pitch. This pitch is approximate due to spring in the wire and the same must be given a "set" to insure accuracy of the pitch.

Accordingly, the helix is then directed to pass through a hardened die 85 which has a helical groove 86. Said die is mounted in a bracket 87 on a slide 88 that is adjustable in ways 89 by means of adjusting screws 90. By adjusting the die 85 with respect to the end of mandrel 79, an ironing relationship is set up between the helix and the walls of groove 86 to either slightly expand or contract the pitch of the helix, as the case may be, and thereby bring the same to the accurate pitch desired. In this manner, wear in the mandrel is compensated for. The helix, designated 91, is guided through the die by a reduced end 92 of the mandrel and the collar 94 is held in place by a suitable bracket 93.

In the above-described manner, an accurately pitched helix is obtained and it will be evident that, in order to orient the turns of the helix with the means 31 and 32 so that the latter will properly threadedly engage and thereby connect adjacent spring coils, as shown in Figs. 16 and 20, the units 27 and 28 are mounted for bodily adjustment on slides 67—68, as above described.

The drive 29 for the helical units 27 and 28 comprises a vertical shaft 94 driven from clutch 30 through bevel gearing 95 to effect a drive, upon coupling of the clutch, from shaft 52 to the chain and sprocket drives 78 and to the wire feeding wheels 72.

The clutch 30 has a clutch lever 96 that is movable through the medium of an air cylinder 97 to either couple or uncouple the drive between shaft 52 and shaft 94. Said air cylinder is controlled by a four-way valve 98 (Fig. 15) and said valve is actuated from an electric current line 99 by solenoids 100 and 101. The manner of operation of valve 98 to control clutch 30 will, hereinafter, be more fully described.

One of the units 27 or 28 has one of its shafts 75 extended to drive the means 39 for controlling the length of feed of the helices 91. This means 39 simply comprises a pair of sprockets 102, one on said extended shaft 75 and the other on a second shaft 103, and a chain 104 having a projection 105 thereon. The chain is of a length substantially equal to the length of feed of the helices and said projection 105 moves with the chain to encounter a switch 106 in a circuit 107 in series with solenoid 101 and across the line 99. It will be evident that, for each cycle of movement of projection 105, the same will close switch 106 to energize solenoid 101 and the latter will actuate valve 98 to direct air to that end of cylinder 97 which will cause clutch lever 96 to de-clutch clutch 30.

The means 31 and 32, that cooperate to engage rows of spring coils 108 therebetween so that said coils will receive helices 91 fed by units 27 and 28, are similar and are best seen in Figs. 9, 12, 13 and 14. The latter three views show the lower means 32 and the following description of the same will serve for the upper means 31.

Channels 49, by means of elements 109 support angles 110 thereabove. Across said angles are mounted spaced plates 111 according to the spacing desired for the spring coils of the rows thereof forming the bed spring. Each plate 111, in line with the path of helix 91, is formed with a transverse groove 112 along which said helix travels from the plate 111, nearest the helical units 27 and 28, past the remotest plate 111 of the several plates provided. Each plate 111 mounts a spacer 113, which extends from its wedge-shaped end 114 to groove 112, to form the upper means 37 and the lower means 38 for guiding the manual positioning of spring coils into the machine. It is thus a simple matter to slide spring coils between any upper and lower adjacent pair of plates 111 so that the upper and lower turns 115 of said coils straddle between the plates as seen best in Fig. 12. The spacers 113 roughly, guide the coils. A seat 116 is provided in each plate to receive the turns 115 in the manner best indicated in Fig. 14.

Below the plates 111 (above, in the means 31) there is provided a pair of side-by-side longitudinal bars 117 and 118, one on either side of grooves 112. These bars are thus arranged in upper and lower pairs as in Fig. 9. Between adjacent plates 111, the bar 117, on the side of the machine receiving the coils 108, is provided with means 119 from engaging the bottom turns 115 of the manually positioned coils and, upon movement of bar 117 from the position of Fig. 14 to that of Fig. 13, said means moves said coils from between seats 116 to a position for receiving the helices 91. The means 119 comprises a lower plate 120, an upper plate 121, and an intermediate plate 122. On the side toward groove 112, the plates 120 and 121 extend beyond plate 122 to form an open jaw that engages the spring turns 115 to effect the mentioned movement of the coils. The bar 118 mounts means 123 that cooperates with the means 119 to locate the spring coils in helix receiving position. Each of means 123 includes a plate 124 that is opposed to plate 122 of the respective means 119, and a spacer plate 125 spacing plate 124 from bar 118. The upper and lower plates 120 and 121 are formed with longitudinal grooves 126 spaced to accommodate the turns of the helix and the plates 122 and 124, on their adjacent edges 127 and 128, respectively, are provided with notches 129 that are so directed as to provide a path for the turns of the helix as the same is fed.

It will be noted from Fig. 20 that the edges 127 and 128 are so formed that each engages two spaced inner points of the turn 115 of one coil and one outer portion of the turn 115 of the other coil of the coils being connected by the helix. In practice, the turns 115 are overlapped, as indicated, to facilitate threading of the helix for a larger number of turns of said helix than if the coils were merely abutted.

To insure proper alignment of the cooperating means 119 and 123, the plates between their end supports 119, are supported by longitudinal bars 130 and the latter by members 131 supported in turn by channels 49.

It will be seen from Figs. 13 and 14 that the upper and lower bars 117 are movable in a path, first away from bars 118, then both away from each other and further away from bars 118 to lose engagement of means 119 with the row of spring coils shown to the left of Fig. 12, then toward each other to bring the means 119 within the turns 115 of the spring coils residing in seats 116, and, finally, toward bars 118 to move the latter coils to the position vacated by the mentioned coils at the left side of Fig. 12. The open jaws of means 119 simultaneously engage an outer portion of said coils at the left and simultaneously move them and the coils connected thereto toward the right as seen in Figs. 12 and 13. The upper and lower bars 118 and the means 123 thereon, simultaneously, are movable in a path away from bars 117 to a position where the latter means reside approximately centrally of the coil turns 115. The bars 118 then are moved away from each other and then simultaneously toward each other and toward bars 117 to their initial position of Fig. 13.

The above-described movements of bars 117 are effected by the means 33 and 34. The latter are substantially similar. Each comprises cam means 132 for moving its respective bar 117 transversely of the machine, cam means 133 for moving said bars toward and from each other, and toggle means 134 for effecting the final movement of said bars into coil-clamping position.

Each cam means 132 comprises a groove cam 135 on each shaft 55 and 59, a follower 136 in the groove of each cam, an arm 137 pivoted at 138 to the machine frame 25 and movable in an arc upon rotation of the cam, and a link 139 connecting the end of said arm to a bracket 140 on each respective bar 117. One revolution of shafts 55 and 59, and, consequently, of cams 135 will cause back and forth movement of bars 117.

Each cam means 133 comprises a groove cam 141 on shafts 55 and 59, a follower 142 in the groove of each cam, a frame 143, guided by rods 144 for vertical movement and controlled by movement of the followers, and a slide connection 145 between each frame 143 and the respective bar 117, whereby the latter are controlled by cams 141 for movement toward and from each other while they may move laterally, by reason of slide connection 145, under control of cam 135.

Thus, the cams 135 and 141 can be designed to obtain the above-described compound movement of bars 117 for feeding a row of coils into position to receive the helical connectors 91.

However, the final movement of bars 117, and more particularly of the means 119 thereon, must be accurately controlled and, upon reaching the final position at the helix feeding points, must be held there against any inadvertent movement as may be caused by slight inaccuracies due to wear in the groove of cams 135. The toggle means 134 are, therefore provided to insure such accurate and non-movable location of the means 119. Upper and lower toggle means are provided and one will be described.

Figure 9:
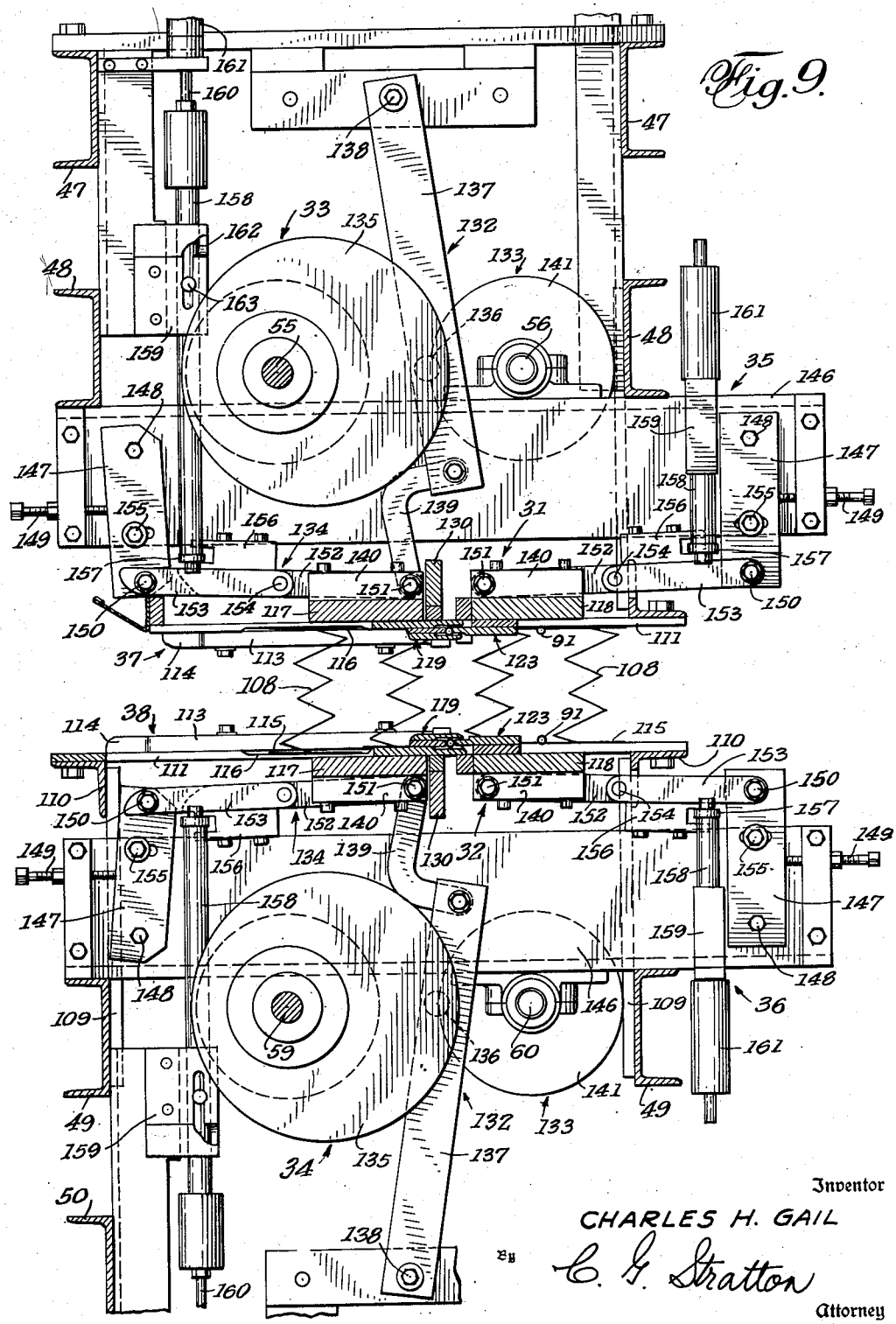
Fig. 9 is a vertical sectional view as taken on line 9—9 of Fig. 1.
Figure 10:
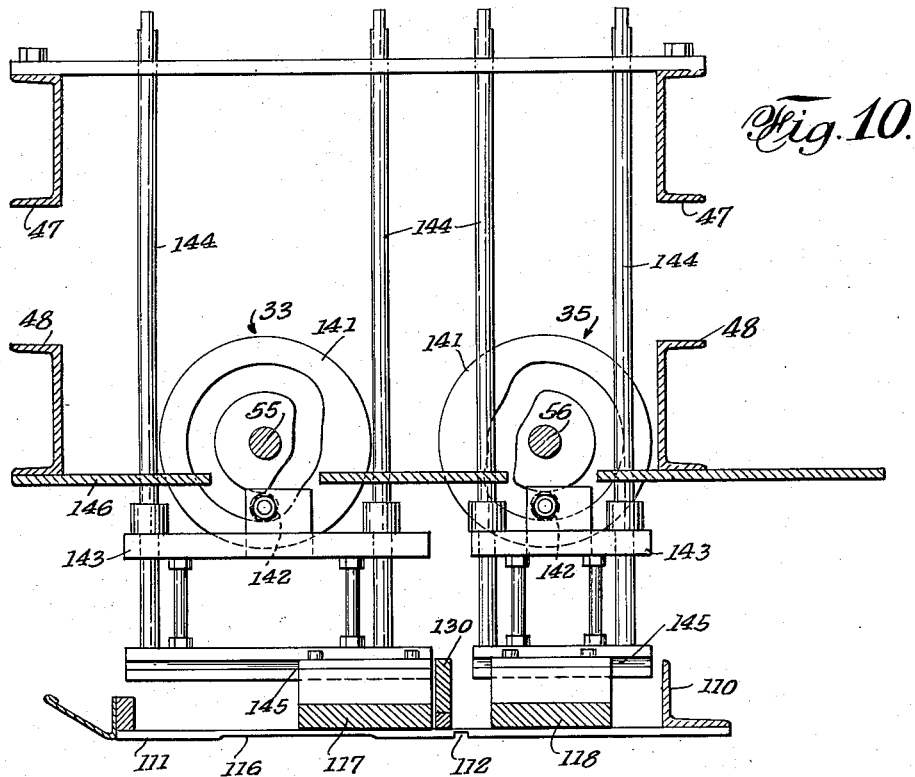
Fig. 10 is a similar view, taken immediately to the rear of the upper portion of Fig. 9.
Figure 11:
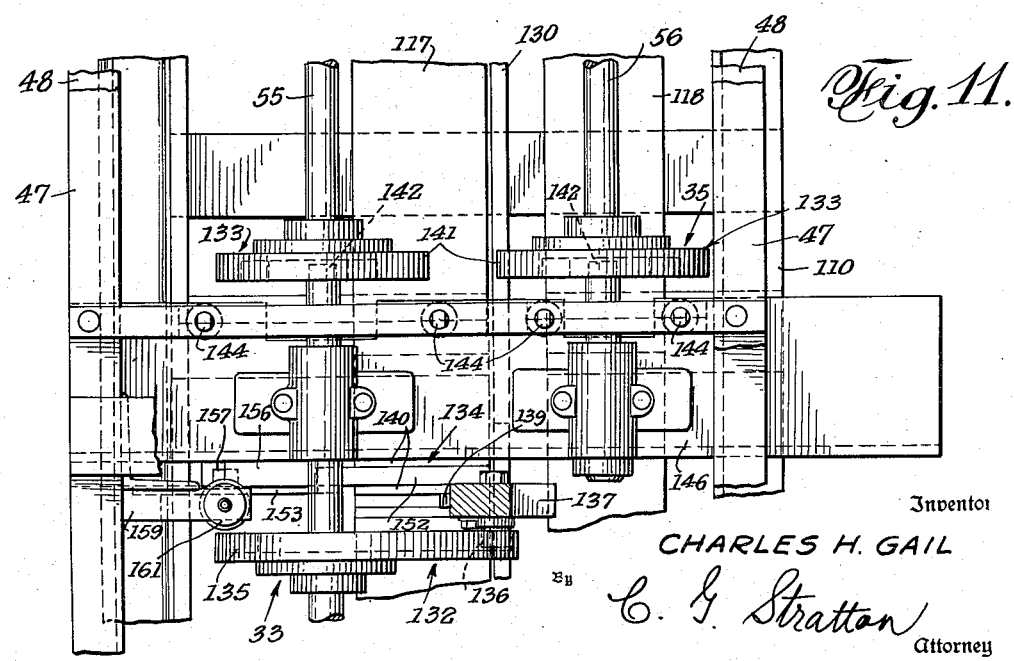
Fig. 11 is a broken plan view of the parts shown in both Figs. 9 and 10.

Across the machine and carried by channels 48, a deep angle member 146 is provided for the upper means 134 (channels 49 support a similar member for the lower means 134). A fulcrum block 147 is pivoted to member 146 at 148 and adjustable by means 149 to bring point 150 into proper spaced relation to pivot 151 of bracket 140. Pivot 151 is connected to a toggle line 152 and point 150 comprises a pivot for a toggle link 153 and said links are connected at a pivot 154. After adjustment, block 147 may be locked in position by a screw 155. The link 152 has an extension between pivots 150 and 154 and the same carries a bifurcated block 156 that is engaged by a lug 157 on a vertically extending rod or shaft 158. A bearing 159 is provided for said shaft whereby the same is movable both longitudinally and rotationally. The upper end of shaft 159 is connected to the piston rod 160 of an air cylinder 161 and it will be evident that air admitted to one end of said cylinder will lift rod 158 and air admitted to the other end will depress said rod. Thus, with the toggle links straightened, as shown in Fig. 9, a lift on rod 158 will cause its lug 157 to lift on block 156 to break the toggle. The cam 135 can then effect retractive movement of bar 117, the toggle links simply further folding during such movement. However, the movement of bar 158 is less than that of block 156 and would interfere with lug 157. To this end, the lug is rotated out of the path of movement of said block by cam face 162 provided in bearing 159 and encountered by a radial pin 163 on rod 158. After bars 117 have been retracted and, under control of cams 135 and 141, are being again projected toward their initial position, air admitted to the cylinder 161 to depress rod 158, re-rotates the lug 157 to re-engage block 156 to effect straightening of toggle links 152 and 153.

This latter straightening of the toggle is utilized to close a switch 164 (Fig. 15) to energize solenoid 100 and, thereby, actuate valve 98 to direct air cylinder 97 for moving clutch lever 96 to couple clutch 30. Thus, only upon straightening of these toggle links, the similar lower one, and those employed in connection with bars 118, can valve 98 be operated to couple clutch 30. Consequently, the helix units operate only when said links are straightened.

The means 35 and 36 for moving bars 118 are substantially similar to the means 33 and 34 with the exception that the toggle means 134 are employed for effecting lateral movement of bars 118 and cams 135 are, therefore, omitted in these latter means. The lugs 157, consequently, retain engagement with their respective bifurcated blocks 156 and cam face 162 and pin 163 are, therefore, omitted from the construction. These toggles effect retraction of bars to move means 123 thereon to approximately central position with respect to the spring coils on the right and the cams 141 on shafts 56 and 60 separate bars 118 and the means 123 thereon to leave a clear path for the movement of the coils under control of means 33 and 34. Straightening of these latter toggles restores means 123 to the position of Figs. 20 and 21 to hold the spring coils fixed to receive helices 91.

Inasmuch as the adjacent coils of the rows of coils are spaced from each other, considerable lengths of helix extend between connected pairs of coils, as best seen in Fig. 12, these intermediate portions of the helices reside in grooves 112 and are also retained from wandering, during feed, by a block 165, preferably carried by each bar 113 and an abutment block 166 affixed to bar 118 opposite each bar 113 and movable through an opening 167 provided in each plate 111. While not shown fully surrounded by wandering prevention members, such means may be readily applied for each of the two helices being fed.

Should the end of a helix become snagged on any obstruction during the feed, the means 40 is provided for stopping the feed. In such an eventuality, the helix somewhere along its length and more particularly at an unconfined point will buckle in a direction off its straight line. This phenomenon is employed to close a switch 168 in circuit 169 connected to solenoid 101, to, thereby, energize said solenoid, actuate valve 98 to bring air into that end of cylinder 97 that will de-clutch clutch 30 and stop the units 27 and 28. Simultaneously, circuit 169, energizes coil 170 to effect mechanical release of clutch lever 96 from the part 171 thereof that closes switch 172 in an electric circuit 173 to solenoid 174. This solenoid actuates a four-way valve 175 to bring air to units 41, 42, 43 and 44 for cutting the helices. Thus, upon a condition abnormal to proper feed of the helices, the succeeding functions of the machine are stopped until such condition is corrected.

The units 41, 42, 43 and 44 each have the like function of cutting one end of a helix and forming said end into a closed loop as shown in Fig. 16. The units 41 and 43 are located at the ends of the upper helix and units 42 and 44 at the ends of the lower one. Because of space conditions in the machine, these units, although similar in function, are somewhat differently constructed and proportioned. Figs. 5 to 7 show the lower unit 42 on the incoming side of the lower helix and said unit will be described it being understood that said description will serve also for units 41, 43 and 44.

Channels 49 support a frame 176 on which is mounted a slide 177. Said slide is moved by an air cylinder 178 through the medium of a piston 179 connected to the slide. Stops 180 and 181 limit the movement of said slide in both directions. A pair of pins 182 on the slide engage a shearing cutter 183 that is pivoted at 184 to move the cutting end 185 of said cutting relative to a shear plate 186.

Said cutter and shear plate are mounted on an arm 187 that is pivoted at 188 on a frame 189 also fixedly mounted across channels 49. A link 190 connects arm 187 with the actuating piston of an air cylinder 191 for rocking said arm to bring the cutter and shear plate into position to cut a helix 91 fed past the unit. A spring 192 normally rocks said arm to hold the cutter and shear plate elevated to provide a path for the feeding movement of the helix.

The cylinder 178 is controlled by valve 175 which, on the return of the clutch lever 96 to de-clutched position to close switch 172 and energize solenoid 174, is actuated to direct air into that end of cylinder 178 which will cause projection of piston 179 and movement of slide 177 in a direction to shear that turn of a helix which is caught between the cutter end 185 and shear plate 186. At the end of this movement of slide 177, the same, as seen in Fig. 15, will close a switch 193 in a circuit 194 that connects in series a solenoid 195 associated with valve 175 and a solenoid 196 associated with a valve 197. The slide 177, thus, causes its own return since valve 175 will be actuated to direct air to that end of cylinder 178 which causes retraction of piston 179. The function of solenoid 196 will be later described.

The frame 189 includes a top plate 198 that is similar to the plates 111 and, together with that one of the latter that is next adjacent, provides a guide and support for the first spring coil 108 of the row thereof that is manually fed to the machine.

The frame 189 is provided with a wall 199 to which is affixed a bracket 200 that mounts a twister unit 201 for forming the mentioned closed loop 202 on the cut end of the helix 91. Said unit comprises a shaft 203 having bearing in said bracket and which carries a gear pinion 204. An upper extension of said pinion is formed as a flange 205 and a compression spring 206 is coiled about shaft 203 and has end abutment on said flange and on the bracket 200, whereby said shaft is held in depressed position. The upper end of shaft 203 extends above the bracket and is formed with a partial upstanding peripheral wall 207 (Figs. 17, 18 and 19) and a somewhat eccentric pin 208 substantially co-extensive therewith. The lower end of the shaft, below the bracket, is bevelled as at 209. The spring 206 normally depresses shaft 203 to hold the wall 207 and pin 208 below the path of movement of a helix.

Means are provided for oscillating shaft 203. Said means comprises a gear rack 210 mounted on a wall 211 comprising part of a slide 212 and normally out of mesh with pinion 204. Said slide is reciprocated by an air cylinder 213 but connected therewith through the cylinder piston 214. Said slide 212 also carries a wedge block 215 that engages the bevel 209 of shaft 203 to lift the shaft and cause mesh of pinion 204 and rack 210 and also raise wall 207 and pin 208 to the position of Fig. 17 wherein said wall and pin flank the end turn of the helix 91. Thus, movement of slide 212 to the right in Fig. 8, will both lift shaft 203 and partially rotate the same in one direction. A movement of the slide to the left will rotate the shaft and allow spring 206 to depress the same to its initial position. To insure such depression of the shaft, a bell-crank lever 216, pivoted at 217 on a fixed wall 218 of frame 189, is engaged by an abutment 219 on slide 212 and rocked to cause its end 220 to bodily depress flange 205 on the pinion.

The movement to the left of the slide is instituted by one or more of the before-described toggles which are broken or folded, to cause lateral separation of bars 117 and 118, when the cutter slide 177 is returned to its initial position to close switch 193 to energize solenoid 196. The latter is associated with four-way valve 197 which is, thus, actuated to direct air to that end of each cylinder 161 that will move rods 158 to break the toggles. Upon such movement of the toggles, one or more of them will close a switch 222 in a circuit 223 to a solenoid 224 that actuates a four-way valve 225 to position the same to direct air to that end of cylinder 213 which will cause movement of slide 212 to the left in Fig. 8.

As shaft 203 is rotated, wall 207 and pin 208 co-operate, as seen in Figs. 18 and 19 to twist the end turn of the helix 91 to form the same into the closed loop 202. When the slide 212 reaches its end position to the left, it closes a switch 226 that closes an electric circuit 227 to a solenoid 228 and the latter actuates valve 225 to direct air to that end of cylinder 213 which will cause the same to return the slide to its initial position at the right—and thereby restore the twister unit 201 to its depressed position.

It will be recalled that the machine is set into operation by stepping on pedal 65 to cause one revolution of each of shafts 55, 56, 59 and 60, and, thereby, the described movements of bars 117 and 118. Toward the end of a full revolution of said shafts, an arm or finger 229, on one of them, closes a switch 230 and a circuit 231 to a solenoid 232 associated with valve 197. This circuit energizes said solenoid to actuate said valve to direct air to that end of each cylinder 161 that moves rods 158 to straighten the toggles. Simultaneously, air is directed, from said valve 197, to cylinder 191 to cause the same, through link 190, to rock arm 187 and move the cutter 185 and its shear plate 186 into position to cut through a helix.

In résumé, the machine functions as follows and it will be noted that the operations are sequential and, in practice, take some twelve seconds—a period of sufficient length to allow an attendant to manually insert a row of spring coils for subsequent connection to the bed spring being produced.

Upon actuation of the foot pedal 65, the bars 117 and 118 and the respective means 119 and 123 move to displace the helix-connected rows of spring coils to the rear of the machine and bring the manually positioned row into position for connection to the last row connected.

Toward the end of this mechanical cycle, switch 230 is closed to actuate valve 197 to direct air to cylinders 161 and thereby straighten toggles 134 to securely hold coils to be connected in helix receiving position. Simultaneously air is directed to each of cylinders 191 to move the cutters into cutting position.

As the toggles straighten, each closes a switch 164 to actuate valve 98 to direct air to cylinder 97 in a direction to couple clutch 30 and set the units 27 and 28 into operation to form helices and to feed them to connect the two rows of coils being held by the means 119 and 123.

This feed continues until projection 105 of means 39 closes switch 106 to actuate valve 98 and direct air to cylinder 97 in a direction to uncouple clutch 30.

This latter action removes clutch lever 96 in a direction to close switch 172 and cause actuation of valve 175 to direct air to cylinders 178 in a direction to move slides 177 to cause operation of the cutters, thus cutting off the forward ends of the helices and also severing them from the connection with units 27 and 28.

At the end of their movement, the slides 177 close switches 193 to actuate valve 175 to direct air to cylinders 178 in a direction to cause return of said slides and separation of the cutter elements 185 and 186. Simultaneously, switches 193 actuate valve 197 to direct air to that end of cylinders 161 which will cause movement of rods 158 in a direction to break the toggles 134. Also, simultaneously, valve 197 breaks the air line to cylinders 191 to vent the same and permit springs 192 to become effective to move the cutters away from the cut helices and provide operating room for the loop-forming or twister means 201.

As the toggles break they close switches 222 and actuate valve 225 to direct air to cylinders 213 and cause twister slides 212 to operate twisters 201.

At the end of their movement, one or more of the twister slides 212 close switches 226 to restore the twisters to their initial inoperative positions.

The cycle of operation is now completed and the machine awaits the next depression of pedal 65 to repeat said cycle.

Should there be an abnormal obstruction to the feed of the helices, the same or any one of them, will buckle or bow outwardly from its normal path to close switch 168. This will result in an immediate de-clutching of clutch 30 and stopping of units 27 and 28 and also a disengagement of the clutch lever 96 from the part 171 thereof that closes switch 172. Thus, upon closing of switch 168, the operation of the cutters is also arrested. It follows then that the operations subsequent to cutting are not performed.

Undue damage to the machine is obviated by providing for the above-described sequential operation, since, upon failure at any point in the operation, the machine will stop so that immediate steps may be taken to correct abnormalities.

As shown in Fig. 22, means may be provided for omitting the helicals 91 after a pre-determined number of rows of coils 108 have been embodied in the bed spring shown, generally, at 300. A table 301 that is aligned with and forms a continuation of the rear ends of plates 111, receives the bed spring as successive rows of coils are connected on. A normally closed electric switch 302 is positioned on the table to be opened by one end coil 303 of the first row of coils of the bed spring. Said switch, as will later be described, is embodied in the circuit controlling energization of solenoid 100 that positions valve 98 for air operation of clutch 30. When coil 303 opens said switch 302, solenoid 100 cannot be energized, clutch 30 remains uncoupled, and the helical units 27 and 28 do not operate.

Upon feed of the next row of coils into the machine, the bed spring 300 will be moved along table 301 to cause coil 303 to engage against a sloping abutment 304. This causes a slight angular displacement of the bed spring on table 301 so that the end coil 305 in the next row is displaced laterally a sufficient amount to clear switch 302 and obviate the same again actuating said switch. Thus, the switch will remain closed and the machine will function normally to form and feed helicals.

Since the rows of coils are connected by helicals, each row, as it is embodied in the bed spring, pushes the previously embodied rows of coils along table 301. When the helicals are omitted, as above described, this push, between unconnected rows, becomes ineffective since the coils overlap. Means for positively pushing the completed bed spring away from the machine so that the last row of coils is removed from interference with the next row of coils being fed, is shown in both Figs. 22 and 23.

Said means comprises a set of fingers 306 that project upwardly through slots 307 in table 301, a bar 308 mounting said fingers, a slide 309 mounting said bar, bearings 310 guiding the slide and carried by a transverse plate 311 across the channels 49, and an extensible connection comprising a member 312 on the slide 309 and a socket 313 therefor on longitudinal bar 118. Thus, the slide 309 and the fingers 306 carried thereby move back and forth together with bar 117 and the extensible connection 312—313 allows said bar to move downward as hereinbefore described.

The fingers 306 are each resiliently mounted on a pivot 314 to, upon retractive movement, slip by that helical 91 which extends across slots 307 and get behind the row of coils forward thereof. However, during normal feed, the fingers merely move forward simultaneously with the bed spring without pushing on the coils immediately forward thereof. But, when helicals are omitted, and there is no push on the completed bed spring, said fingers will engage the coils immediately forward thereof and push the bed spring clear of the machine. The fingers perform their movement with each feed of a row of coils but are operatively effective only as above indicated.

It will be recalled that a row of coils is manually fed to the machine to be picked up by the means 119 and fed, together with the preceding row of coils to helical-receiving position. A modification is shown in Fig. 24 wherein an intermediate row of coils is interposed forward of the manually fed row. This latter form has the advantage of having the manual feed more outward so that the operator can feed the coils to a position nearer the front of the machine and thereby performing a shorter and less time- and energy-consuming movement. A further advantage lies in a mechanical feed of that row of coils that follows the rows being connected by helices.

As shown in Fig. 24, upper and lower bars 117, toward the front of the machine, each carry a plate 315 that has spaced rearwardly and upwardly directed projections 316 that are so spaced with relation to edge 127 of means 119 that the same engages the upper and lower turns 115 of one row of coils as said edges 127 engage the similar turns of a forward row. Further, the seats 116 are omitted and in their stead projections 317 are so positioned on plates 111 as to cause the lower of the turns of the first mentioned coils to tilt downwardly at their forward sides to insure said forward sides underlying the rearward sides of the forward row of coils as shown in Fig. 24. The respective upper turns are similarly overlapped. Thus, a mechanical feed for the coils is provided to insure the same overlapping relationship among the coils of adjacent rows, and the helices, as they are fed to connect said rows, at all times meet the same condition at the overlap of the coils.

The modification shown in Fig. 25, as before, closes switch 230 to energize solenoid 232 and thereby actuate valve 197 to direct air to cylinders 161 and cause straightening of toggles 134. Upon straightening of said toggles, switches 164 will close and, if switch 302, in series with switches 164 is closed, solenoid 100 will then be energized to operate valve 98 to direct air to cylinder 97 in a direction to couple clutch 30 and set units 27 and 28 into operation to form and feed helices.

This feed continues until projection 105 of means 39 closes switch 106 to energize solenoid 101 and operate valve 98 to direct air to cylinder 97 in a direction to uncouple clutch 30.

When clutch 30 was coupled, the lever 96 thereof engaged and moved a slide 318, against the pull of a spring 319, to close a switch 320. The latter is in a circuit 321 that includes a solenoid 322. The movable armature 323 of said solenoid is so inter-connected with one-revolution clutch 64 that, upon energization of the solenoid, its armature will move to lock said clutch open. Consequently, should the operator step on pedal 65 during this intermediate stage of the cycle of operation of the machine, the mechanical phase of the operation cannot be instituted.

When the slide 318 moves as described, the core 324 of a solenoid 325 or any part controlled thereby, moves in behind said slide to hold switch 320 closed when clutch lever 96 of clutch 30 moves back to its initial position when said clutch 30 is uncoupled upon closing of switch 106.

A switch 326 is placed immediately adjacent to switch 106 and since there is a slight overtravel of chain 104, the projection 105 thereon after closing switch 106, moves by and closes switch 326. A circuit 327 is made by said latter switch to energize solenoid 174 and operate valve 175 to direct air to cylinders 178 in a direction to move slides 177 to cause operation of the cutters, thus cutting off the forward ends of the helices and also severing them from connection with units 27 and 28.

At the end of their movement, the slides 177 close switches 193 to simultaneously perform three steps of the cycle of operation. Closing of switch 193, through circuit 194, energizes solenoid 195 to actuate valve 175 and effect return of cutter slides 177. At the same time a circuit 328 is closed to solenoid 196 to actuate valve 197 to effect breaking of toggles 134 and lifting of cutters 183. Simultaneously, a circuit 329 is closed to solenoid 224 to operate valve 225 to direct air to cylinders 213 in a direction to operate twister slides 212 and twisters 201.

At the end of the operative movement of the twister slides 212, one or more of said slides close switches 226 and through circuit 227 to energize solenoid 228, operate valve 225 and, thereby, restore the slides 212 to their initial position. Simultaneously, a circuit 330 is closed through solenoid 325 to cause retraction of its armature 324 and permit spring 319 to retract slide 318. The switch 320 will then open and effect release of main clutch 64. Now, when the operator steps on pedal 65, the next cycle of operation is instituted.

It will be seen from the above, that only after the last operation—the twisting of the ends of the helices—can the cycle of operation be again started.

The means 40 is embodied in the machine as hereinbefore described.

While I have illustrated and described what I now regard as the preferred embodiments of my invention, the construction is, of course, subject to modifications without departing from the spirit and scope of my invention. I, therefore, do not wish to restrict myself to the particular forms of construction illustrated and described, but desire to avail myself of all modifications that may fall within the scope of the appended claims.

Having thus described my invention, what I claim and desire to secure by Letters Patent is:

1. A machine for producing a bed spring formed of spring coils and helical connectors and including helical connector-advancing means, said machine comprising a frame, a plate part held in fixed position by the frame to support the spring coils for sliding movement therealong, two parallel movable members that coact with the plate part and each provided with coil-engaging means, the coil-engaging means on one movable member moving the coils to be attached and provided with an overstanding guide defining a path for the helical connector, means to reciprocate the parallel members toward and from each other and toward and from the plate part to engage and disengage the coil-engaging means of said members, and pneumatic means to lock the two members with their coil-engaging means together and while a helical connector is advanced to connect the coils and to unlock said members preparatory to movement of the members away from each other to disengage the coil-engaging means thereof from each other after the helical connector has connected the coils.

2. A machine according to claim 1: said helical-advancing means including helical-forming means, means to drive the latter means, and means controlled by the pneumatic means, when operated to lock the two parallel members, to operatively connect the drive of the helical-forming means to institute forming and advancing of the helical only when the locked members hold the coils positioned.

3. A machine according to claim 1: said helical-advancing means including helical-forming means, means to drive the latter means, means controlled by the pneumatic means, when operated to lock the two parallel members, to operatively connect the drive of the helical-forming means to institute forming and advancing of the helical only when the locked members hold the coils positioned, and means responsive to an obstruction in the path of feed of the helical connector and operated by said connector, upon distortion from its normal condition, to stop the drive of the helical-forming means.

4. A machine according to claim 1: said helical-advancing means including helical-forming means, means to drive the latter means, means controlled by the pneumatic means, when operated to lock the two parallel members, to operatively connect the drive of the helical-forming means to institute forming and advancing of the helical only when the locked members hold the coils positioned, means responsive to an obstruction in the path of feed of the helical connector and operated by said connector, upon distortion from its normal condition, to stop the drive of the helical-forming means, means to sever the helical connector between the helical-forming means and the coils next adjacent thereto, and pneumatic means controlled by the helical-forming means to operate said severing means.

5. A machine according to claim 1: said helical-advancing means including helical-forming means, means to drive the latter means, means controlled by the pneumatic means, when operated to lock the two parallel members, to operatively connect the drive of the helical-forming means to institute forming and advancing of the helical only when the locked members hold the coils positioned, means responsive to an obstruction in the path of feed of the helical connector and operated by said connector, upon distortion from its normal condition, to stop the drive of the helical-forming means, means to sever the helical connector between the helical-forming means and the coils next adjacent thereto, pneumatic means controlled by the helical-forming means to operate said severing means, means at each end of the helical connector to form a loop on each said end, and means controlled by the connector-severing means to operate said loop-forming means.

6. In a machine for producing a bed spring formed of spring coils and helical connectors connecting the respective upper and lower turns of said spring coils, said machine including upper and lower helical-advancing means, the improvements which comprise a frame, upper and lower plate parts held in fixed position by the frame and between and along which the spring coils are slidingly movable, upper and lower parallel pairs of members that coact with the respective plate parts and each said member being provided with coil-engaging means, the coil-engaging means of one movable member of each pair of members moving the coils to be attached and provided with an overstanding guide, said guides defining upper and lower paths for the respective upper and lower helical connectors moving in said advancing means, means to move the members of each pair thereof toward and from each other and toward and from the respective plate parts to engage and disengage the coil-engaging means of said members, and pneumatic means to lock the members of each pair with their coil-engaging means together and while the helical connectors are advanced to connect the upper and lower turns of said spring coils and to unlock said members preparatory to movement of the pairs of members away from each other to disengage the coil-engaging means thereof from each other after the helical connectors have connected the coils.

7. In a machine according to claim 6: the means to move one member of each pair comprising two sets of simultaneously-acting cams, one set being operatively connected to each said member, each set comprising a cam to move the said members toward and away from each other and a cam to move the said members toward and from the other members of the pairs thereof.

8. In a machine according to claim 6: the means to move one member of each pair comprising a cam connected to each said member to move said members toward and from each other, and toggle means controlled by the pneumatic means and connected to each said member to move the same toward and away from the other members of the pairs thereof.

9. In a machine according to claim 6: the means to move one member of each pair comprising two sets of simultaneously-acting cams, one set being operatively connected to each said member, each set comprising a cam to move the said members toward and away from each other and a cam to move the said members toward and from the other members of the pairs thereof, and the means to move the other member of each pair comprising a cam connected to each latter member to move the same toward and from each other, and toggle means controlled by the pneumatic means and connected to each said other member to move the same toward and away from the first-mentioned members of the pairs thereof.

10. In a machine according to claim 6: the means to move one member of each pair comprising two sets of simultaneously-acting cams, one set being operatively connected to each said member, each set comprising a cam to move the said members toward and away from each other and a cam to move the said members toward and from the other members of the pairs thereof, and the means to move the other member of each pair comprising a cam connected to each latter member to move the same toward and from each other, and toggle means controlled by the pneumatic means and connected to each said other member to move the same toward and away from the first-mentioned members of the pairs thereof, the mentioned sets of cams, cams and toggle means, that control the movement of both pairs of members, being coordinated to move one member of the upper and lower pairs simultaneously toward and from each other and toward and from the other members and to move the other member of said upper and lower pairs simultaneously toward and from each other and toward and from the first-mentioned members.

11. In a machine of the character described, a frame, a plate part fixedly carried by the frame to support spring coils, two parallel movable members that coact with the plate part and each provided with coil-engaging means, mechanical means including a drive having an operator-controlled one-revolution clutch to move said members to feed successive rows of spring coils along the plate part to a coil-tying position, the coil-engaging means of said members cooperating to hold the coils in tying position and defining a path of a helical connector, helical-connector forming and advancing means, electro-pneumatic means controlled by said drive, near the end of the cycle of operation of the mechanical means, to operate the helical-connector forming and advancing means and rotationally project a helical connector along the mentioned path to tie adjacent rows of coils in tying position, means to cut the ends of said connector while in tying position and form loops on said ends, means operative by the electro-pneumatic means to operate the connector cutting and loop-forming means, means to automatically lock said clutch against control by an operator before completion of the cycle of operation of the electro-pneumatic means, means controlled by the loop-forming means to release said locking means and free the clutch for subsequent operation by the operator, a pneumatically-controlled second clutch in the drive between the same and the connector-forming and -feeding means, and means controlled by the second clutch to effect the mentioned automatic locking of the first-mentioned clutch when said second clutch is coupled.

12. In a machine for producing a bed spring formed of rows of spring coils each having upper and lower turns connected by helices and provided with upper and lower helix-forming and -feeding means and with a station along which the helices formed by said means are fed, upper and lower fixed guides defining paths of movement for the aligned spring coils of said rows and engaged with the upper and lower turns of said coils, spaced projections in each path and carried by the fixed guides, means to simultaneously move three adjacent rows of coils along said paths to bring the upper and lower turns of two of said rows into position to be connected by said helices and to bring the upper and lower turns of the third row into overlapping relation with the upper and lower turns of the adjacent row of said two rows, said projections, as the third row of spring coils moves therepast, first tilting the upper and lower turns of said coils in one angular direction and then in the other to bring the forward portions of the turns of the third row of coils into said overlapping relation, said row-moving means comprising an upper slide above the upper fixed guides and a lower slide below the lower fixed guides, means to reciprocate said slides simultaneously toward and from the station along which the helices are fed, means to raise and lower the upper slide relative to its fixed guides and simultaneously lower and raise the lower slide relative to its fixed guides and during reciprocation of the slides to impart a compound vertical and horizontal movement to each slide that is opposite to the movement of the other, fixed hook means on each slide directed into the path of movement of the spring coils and having hooking engagement with the respective upper and lower turns of the first-mentioned two rows of coils when the upper slide is in lowermost position, the lower slide in uppermost position, and both slides are moving toward the mentioned station to move said two rows of coils to helix-connecting position, and second fixed hook means on each slide directed in the path of movement of the spring coils and having hooking engagement with the respective overlapped upper and lower turns of the third row of coils and the row adjacent thereto when the slides are in the position and moving in the direction last mentioned.

13. In a machine for producing a bed spring formed of successive rows of spring coils connected by helices and having means to form and feed helices to connect adjacent rows of coils and to cut said helices after connecting such rows and provided with means to position and hold adjacent rows of coils to be connected by said helices, said machine being provided with a support along which the connected coils constituting a bed spring are moved and with means to intermittently move the bed spring; the improvement that comprises a support comprising an extension of the mentioned support of the machine to receive and support the portion of the bed spring moved outward from said support of the machine means connected to the coils-moving means and engaged with the portion of the bed spring on the support extension to move the bed spring intermittently and progressively along said support extension, and electrical means embodying a control switch in the path of movement of the bed spring and engaged and operated by said bed spring to stop the operation of the helix-forming and -feeding means, whereby, after a predetermined number of rows of coils have been connected, the last-connected row of coils and the row following the same remain unconnected.

14. In a machine according to claim 13: and means to restore operation of the helix-forming and -feeding means upon the next advance of the bed spring, said means comprising an angularly disposed fixed member in the path of one side of the bed spring and located beyond and adjacent said switch to laterally displace the bed spring, as the same is moved, out of engagement with the switch to effect such restoration of the helix-forming and -feeding means.

CHARLES H. GAIL.

References Cited in the file of this patent
UNITED STATES PATENTS

| Number | Name | Date |
|---|---|---|
| 1,706,889 | Kroehler | Mar. 26, 1929 |
| 1,849,394 | Wunderlich | May 15, 1932 |
| 1,905,459 | Gail | Apr. 25, 1933 |
| 1,920,862 | Heuer | Aug. 1, 1933 |
| 1,930,715 | Heuer | Oct. 17, 1933 |
| 2,026,276 | Erickson | Dec. 31, 1935 |
| 2,161,689 | Strandberg | June 6, 1939 |
| 2,176,262 | Kirchner | Oct. 17, 1939 |
| 2,262,994 | Dickey | Nov. 18, 1941 |
| 2,282,664 | Marcus | May 12, 1942 |
| 2,286,326 | Zimmerman | June 16, 1942 |
| 2,296,878 | Saval | Sept. 29, 1942 |
| 2,351,659 | Bronstien | June 20, 1944 |
| 2,388,106 | Woller | Oct. 30, 1945 |
| 2,470,812 | Gauci | May 24, 1949 |